(12) United States Patent
Bailliu et al.

(10) Patent No.: US 12,714,029 B2
(45) Date of Patent: Aug. 25, 2026

(54) FORCE OPTIMIZATION ON GRAIN CLEANING DRIVE SYSTEM OF COMBINE HARVESTER

(71) Applicants: CNH Industrial America LLC, New Holland, PA (US); CNH Industrial Belgium N.V., Zedelgem (BE)

(72) Inventors: Stijn Bailliu, Zedelgem (BE); Michiel Vanderstichele, Merkem (BE); Curtis Hillen, Lititz, PA (US); Jonas Deprauw, Lauwe (BE)

(73) Assignees: CNH Industrial America LLC, New Holland, PA (US); CNH Industrial Belgium N.V. (BE)

( * ) Notice: Subject to any disclaimer, the term of this patent is extended or adjusted under 35 U.S.C. 154(b) by 321 days.

(21) Appl. No.: 18/437,328

(22) Filed: Feb. 9, 2024

(65) Prior Publication Data

US 2025/0255221 A1 Aug. 14, 2025

(51) Int. Cl.
*A01F 12/44* (2006.01)
*A01F 12/56* (2006.01)

(52) U.S. Cl.
CPC .......... *A01F 12/446* (2013.01); *A01F 12/448* (2013.01); *A01F 12/56* (2013.01)

(58) Field of Classification Search
CPC ....... A01F 12/448; A01F 12/446; A01F 12/56
See application file for complete search history.

(56) References Cited

U.S. PATENT DOCUMENTS 6,412,260 B1 7/2002 Lukac et al.
9,844,186 B2 12/2017 Walter et al.
10,039,236 B2 8/2018 Duquesne et al.
2006/0270473 A1* 11/2006 Straeter ................ A01D 75/282 460/99
2008/0004092 A1* 1/2008 Nelson .................. A01F 12/448 460/101
2008/0318650 A1* 12/2008 Dhont ..................... A01F 12/44 460/101
2017/0086380 A1* 3/2017 Walter .................. A01F 12/444

FOREIGN PATENT DOCUMENTS

EP 3150059 A1 4/2017

OTHER PUBLICATIONS

The Extended European Search Report issued Sep. 29, 2025, by the European Patent Office in corresponding European Patent Application No. 25156665.9. (9 pages).

* cited by examiner

*Primary Examiner* — Brad Harcourt
(74) *Attorney, Agent, or Firm* — Buchanan Ingersoll & Rooney PC

(57) ABSTRACT

A grain cleaning system for a combine harvester includes a chaffer and a sieve positioned below the chaffer. A first link includes a first end and a second end coupled to the chaffer. A second link includes a first end and a second end coupled to the sieve. A drive shaft is driven by a drive system to rotate about a shaft axis, wherein rotation of the drive shaft drives the first link to reciprocate the chaffer and drives the second link to reciprocate the sieve. The drive system is configured to control reciprocating motion of the chaffer and sieve with the goals of (i) minimizing vibrations of the cleaning system, (ii) minimizing destructive forces on the bearings (and other components) of cleaning system, and (iii) minimizing the power required to reciprocate the chaffer and sieve back and forth.

13 Claims, 6 Drawing Sheets

FORCE OPTIMIZATION ON GRAIN CLEANING DRIVE SYSTEM OF COMBINE HARVESTER

FIELD OF THE INVENTION

The present invention relates to a combine harvester agricultural machine, and more particularly, to a drive for a grain cleaning system of a combine harvester.

BACKGROUND OF THE INVENTION

Combines are used to harvest agricultural crops such as corn, soybeans, wheat and other grain crops. As the combine is driven through crop fields, the combine cuts the crop, separates the desired crop from the undesired waste, stores the crop, and discards the waste.

In a typical combine, a header is mounted to the front of the combine to gather the crop and feed the crop into the combine for processing. As the combine is driven through the field, the crop material is collected by the header and deposited into a feeder housing. The crop material is then transported upwardly and into the combine by a feed elevator located within the feeder housing. The crop material then passes through a threshing and separating mechanism. In a rotary combine, the threshing and separating mechanism includes a rotor, a threshing concave, a rotor cage, and a separating grate. As crop material passes between the rotor, the threshing concave and the separating grate, the crop material is impacted and/or rubbed, thereby causing the grain to separate from the stalk material. The stalk material that is separated from the grain is commonly referred to as material other than grain (MOG). Other types of combines are also known that perform similar functions using different mechanisms.

After passing through the threshing and separating assembly, the grain and MOG are deposited onto a grain cleaning system. The grain cleaning system of a typical combine includes a plurality of adjustable cleaning sieves including a chaffer sieve, a shoe sieve, and (optionally) a pre-cleaning sieve. These sieves are typically reciprocated back and forth in opposite directions. This motion has the tendency to separate the grain from the MOG. To further separate the grain from the MOG, a cleaning fan or blower is positioned so as to blow air up through the cleaning sieves. This flow of air tends to blow the MOG, which is typically lighter than grain, rearwardly and out the back of the combine. Grain, which is heavier than MOG, is allowed to drop through the openings in the sieve.

The clean grain that falls through the cleaning sieves is deposited on a collection panel positioned beneath the cleaning sieves. The collection panel is angled so as to permit the grain to flow, under the influence of gravity, into an auger trough positioned along the lowermost edge of the collection panel. The auger trough is typically positioned near the forward end of the cleaning sieves and extends along the width of the sieves. The grain collected in the auger trough is then moved by an auger towards the side of the combine where it is raised by a grain elevator and deposited into a storage tank or grain tank.

Turning back to the grain cleaning system, that system can be subject to high peak forces as the sieves are reciprocated back and forth, which forces can be destructive to the cleaning system. While it is possible to increase the size and thickness of the grain cleaning system components to handle the higher peak forces, the space for accommodating those components is limited and it has been found that using larger components could have a negative impact on the structural and/or functional geometry of the cleaning system. Described herein is a system that is designed for reducing the aforementioned forces, while also minimizing the power required to reciprocate the sieves. Minimizing the power required to reciprocate the sieves results in either conservation of that power or the ability to use that power for other systems of the combine harvester.

SUMMARY OF THE INVENTION

According to one example, a grain cleaning system for a combine harvester is provided. The combine harvester includes a chassis and a header for harvesting agricultural material. The grain cleaning system comprises:

a chaffer configured to be supported for movement relative to the chassis between a chaffer front dead point (FDP) and a chaffer rear dead point (RDP);

- a sieve positioned below at least a portion of the chaffer, the sieve configured to be supported for movement relative to the chassis between a sieve FDP and a sieve RDP;
- a first link including a first end and a second end coupled to the chaffer;
- a second link including a first end and a second end coupled to the sieve; and
- a drive shaft driven to rotate about a shaft axis, the rotation of the drive shaft driving the first link to reciprocate the chaffer and driving the second link to reciprocate the sieve,
- wherein either (i) when the sieve is positioned at the sieve FDP, the chaffer is positioned at a location between the chaffer RDP and a chaffer midpoint (MP) position that is defined between the chaffer RDP and chaffer FDP, or (ii) when the sieve is positioned at the sieve RDP, the chaffer is positioned at a location between the chaffer FDP and the chaffer MP.

According to another alternative, when the sieve is positioned in the sieve RDP or the sieve FDP, the chaffer is positioned at a chaffer midpoint (MP) that is defined between the chaffer RDP and chaffer FDP.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

The terms “grain”, “straw” and “tailings” are used principally throughout this specification for convenience but it is to be understood that these terms are not intended to be limiting. Thus “grain” refers to that part of the crop material which is threshed and separated from the discardable part of the crop material, which is referred to as non-grain crop material, MOG or straw. Incompletely threshed crop material is referred to as “tailings”. Also the terms “forward”, “rearward”, “left” and “right”, when used in connection with the agricultural harvester and/or components thereof are usually determined with reference to the direction of forward operative travel of the combine harvester, but again, they should not be construed as limiting. The terms “longitudinal” and “transverse” are determined with reference to the fore-and-aft direction of the agricultural harvester and are equally not to be construed as limiting.

Figure 1:
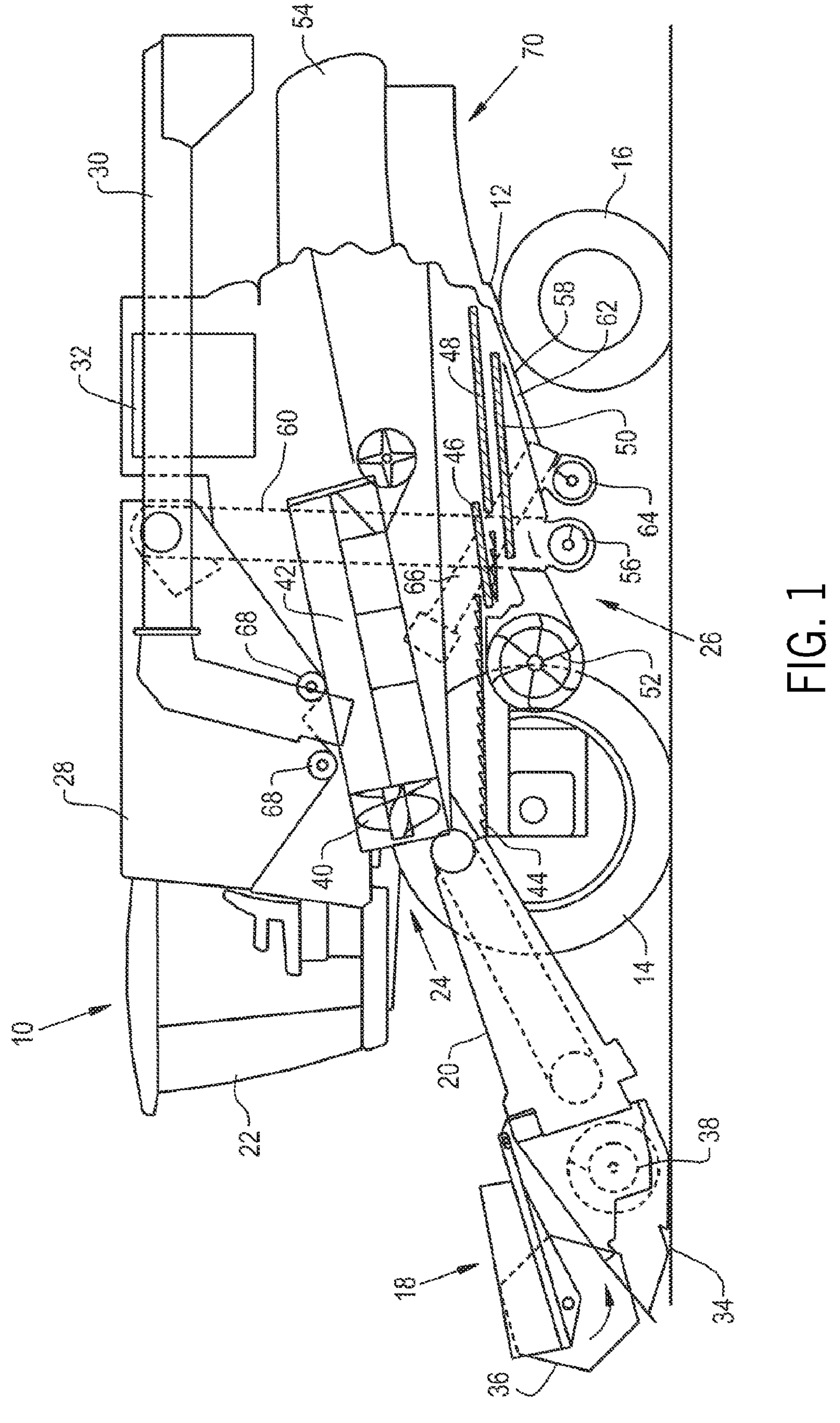
FIG. 1 is a side view of an embodiment of an agricultural combine harvester, in accordance with an exemplary embodiment of the present invention.

Referring now to the drawings, and more particularly to FIG. 1, there is shown an agricultural harvester in the form of a combine 10, which generally includes a chassis 12, ground engaging wheels 14 and 16, a header 18, a feeder housing 20, an operator cab 22, a threshing and separating system 24, a grain cleaning system 26, a grain tank 28, and an unloading auger 30. Motive force is selectively applied to front wheels 14 through a power plant in the form of a diesel engine 32 and a transmission (not shown). It should be appreciated that while the agricultural harvester is shown as combine 10, the agricultural harvester can be any type of construction that allows for crop material to be harvested such as a conventional combine (which does not have a rotor), rotary combine, hybrid combine, chopper harvester, etc.

The header 18 is mounted to the front of the combine 10 and includes a cutter bar 34 for severing crops from a field during forward motion of the combine 10. A rotatable reel 36 feeds the crop into the header 18, and a double auger 38 feeds the severed crop laterally inwardly from each side toward the feeder housing 20. The feeder housing 20 conveys the cut crop to the threshing and separating system 24, and is selectively vertically movable using appropriate actuators, such as hydraulic cylinders (not shown).

The threshing and separating system 24 generally includes a rotor 40 at least partially enclosed by and rotatable within a corresponding perforated concave 42. The cut crops are threshed and separated by the rotation of the rotor 40 within the concave 42, and larger elements, such as stalks, leaves and the like are discharged from the rear of the combine 10. Smaller elements of crop material including grain and non-grain crop material, including particles lighter than grain, such as chaff, dust and straw, are discharged through perforations of the concave 42.

Grain which has been separated by the rotor 40 and perforated concaves 42 falls onto a main grain pan 44 and is conveyed toward grain cleaning system 26. The grain cleaning system 26 may include an optional pre-cleaning sieve 46, an upper sieve 48 (also known as a chaffer sieve), a lower sieve 50 (also known as a shoe sieve), and a cleaning fan 52. Grain on the sieves 46, 48 and 50 is subjected to a cleaning action by the fan 52 which provides an airflow through the sieves to remove chaff and other impurities such as dust from the grain by making this material airborne for discharge from straw hood 54 of the combine 10. The main grain pan 44 and the pre-cleaning sieve 46 oscillate or reciprocate in a fore-to-aft manner to transport the grain and finer non-grain crop material to the upper surface of the upper sieve 48. The upper sieve 48 and the lower sieve 50 are vertically arranged relative to each other, and likewise oscillate in a fore-to-aft manner to spread the grain across the sieves 48, 50, while permitting the passage of cleaned grain by gravity through the openings of the sieves 48, 50.

Clean grain falls to a clean grain auger 56 positioned crosswise below and in front of the lower sieve 50. The clean grain auger 56 receives clean grain from each sieve 48, 50 and from a bottom pan 58 of the grain cleaning system 26. The clean grain auger 56 conveys the clean grain laterally to a generally vertically arranged elevator 60, which can also be referred to as a grain elevator, for transport to the grain tank 28. Tailings from the grain cleaning system 26 fall to a tailings auger on pan 62. The tailings are transported via a tailings auger 64 and a return auger 66 to the upstream end of the grain cleaning system 26 for repeated cleaning action. A pair of grain tank augers 68 at the bottom of the grain tank 28 convey the clean grain laterally within the grain tank 28 to the unloading auger 30 for discharge from combine 10. The non-grain crop material proceeds through a residue handling system 70. The residue handling system 70 may include a chopper, counter knives, a windrow door and a residue spreader.

Figure 2:
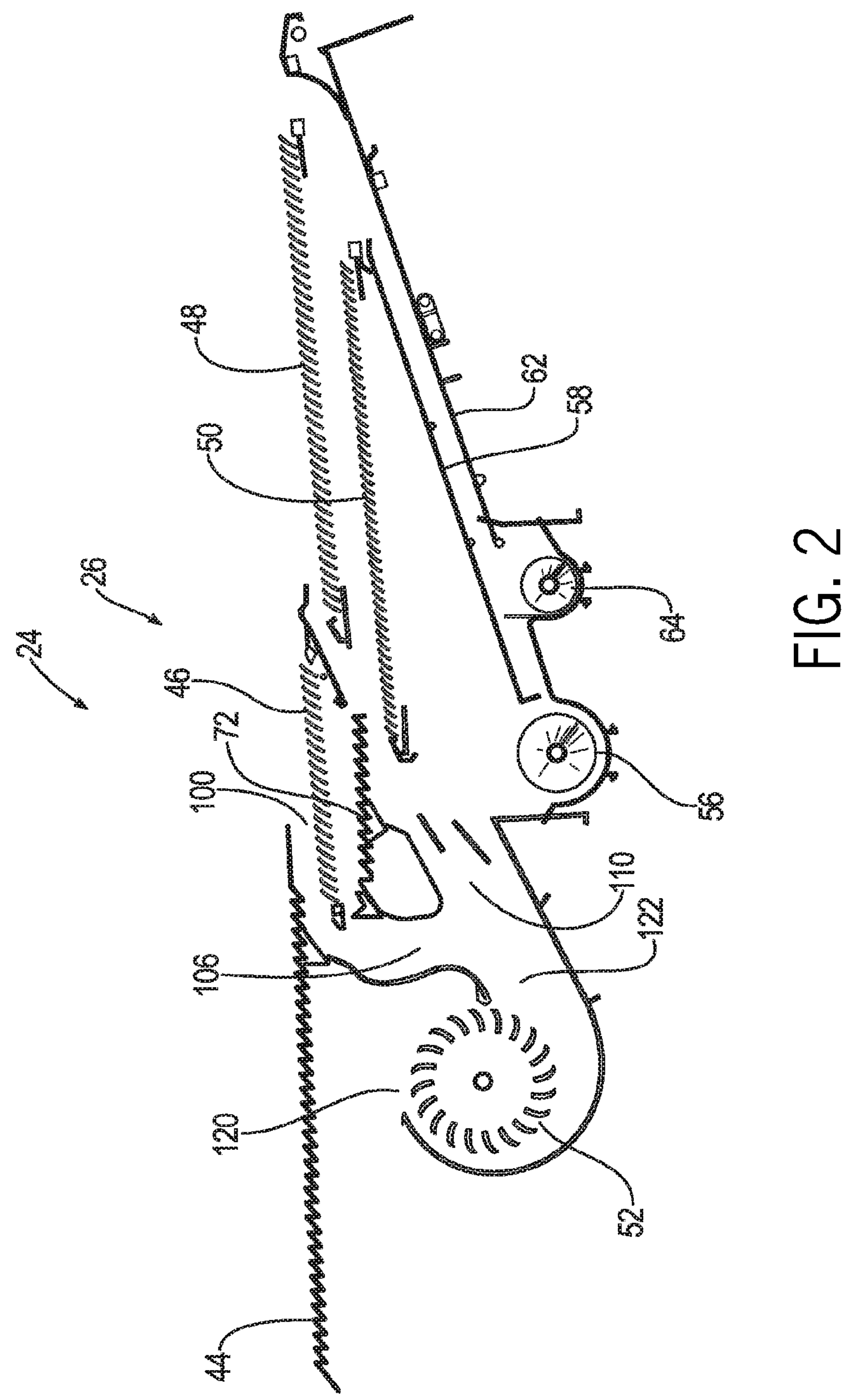
FIG. 2 is a cross-sectional view of a grain cleaning system of the combine of FIG. 1, the grain cleaning system being shown schematically.

Referring now to FIG. 2, a grain cleaning system 26, which forms part of the threshing and separating system 24, is shown in cross-section. Prior to reaching the grain cleaning system 26, the rotor 40 and perforated concave 42 (not shown in FIG. 2) operate to create a mat of the crop material and pass it through a narrow gap between the rotor 40 and the perforated concave 42 to thresh or separate the grains from the larger elements of MOG such that a flow of the grain will be discharged into the grain cleaning system 26. This flow of grain will include some smaller elements of MOG, and falls on the main grain pan 44. A reciprocating motion causes the mixture of grain and residual MOG to move rearwardly until it passes over a fall step 100. The mixture then falls on the pre-cleaning sieve 46, where a certain volume of the mixture of grain and residual MOG are separated, again under reciprocal motion of the pre-cleaning sieve. Excess volume of the mixture of grain and residual MOG passes over the pre-cleaning sieve 46 onto the upper or chaffer sieve 48. The grain cleaned by pre-cleaning sieve 46 and upper sieve 48 then falls through to lower or shoe sieve 50 for further cleaning, also under reciprocal motion.

Throughout this movement of the mixture of grain and residual MOG, a cleaning fan 52 blows air up past the ends of the main grain pan 44 and the grain transfer pan 72, and up through the pre-cleaning sieve 46, the upper sieve 48, and the lower sieve 50, by way of fan main outlet 122 leading to a fan upper outlet 106 and a fan lower outlet 110, guided by fan outlet air guide 112. Further details in connection with cleaning system 26 are described in U.S. Pat. No. 10,039,236, which is incorporated by reference in its entirety and for all purposes.

Figure 3:
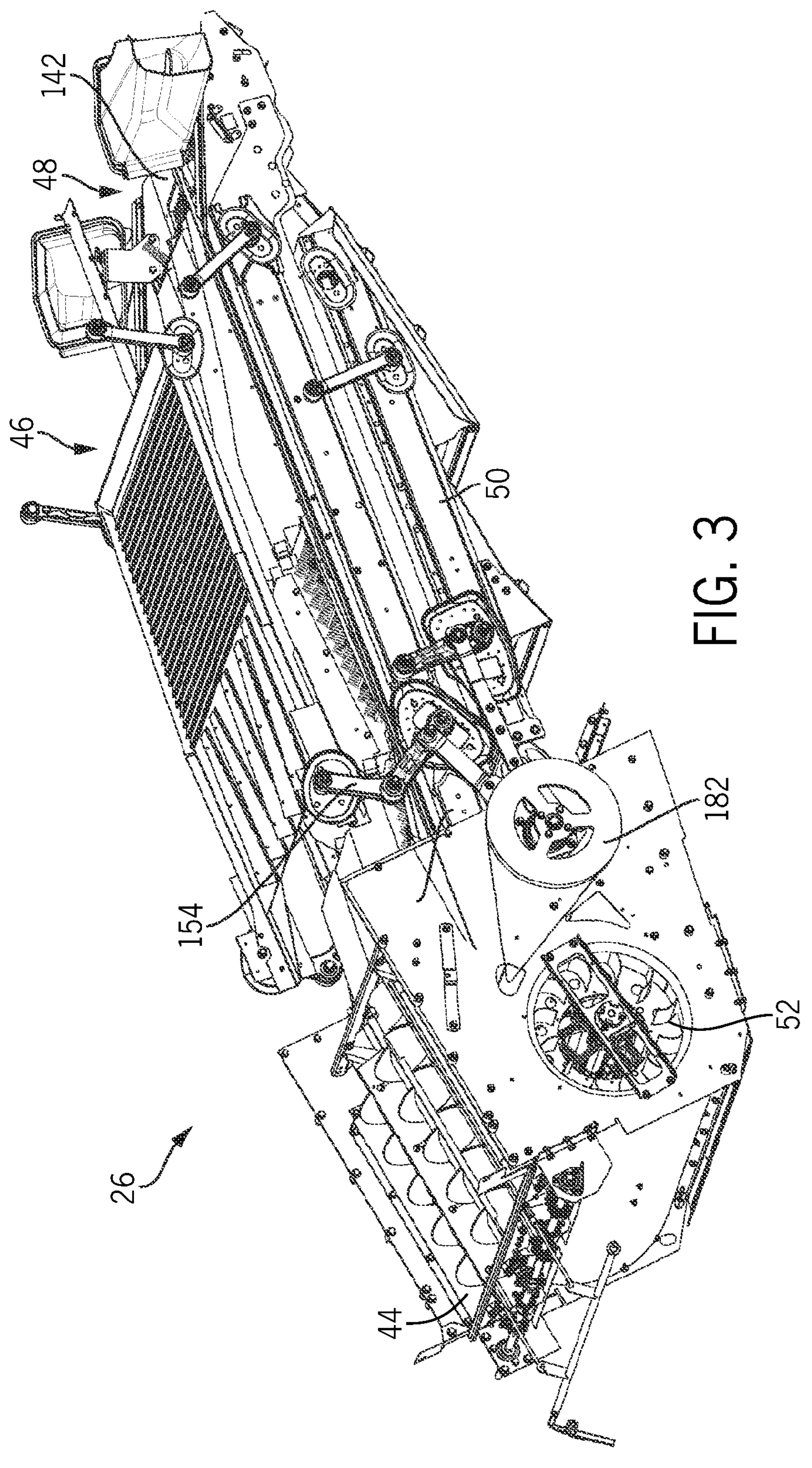
FIG. 3 is an isometric view of the grain cleaning system of FIG. 2.
Figure 4:
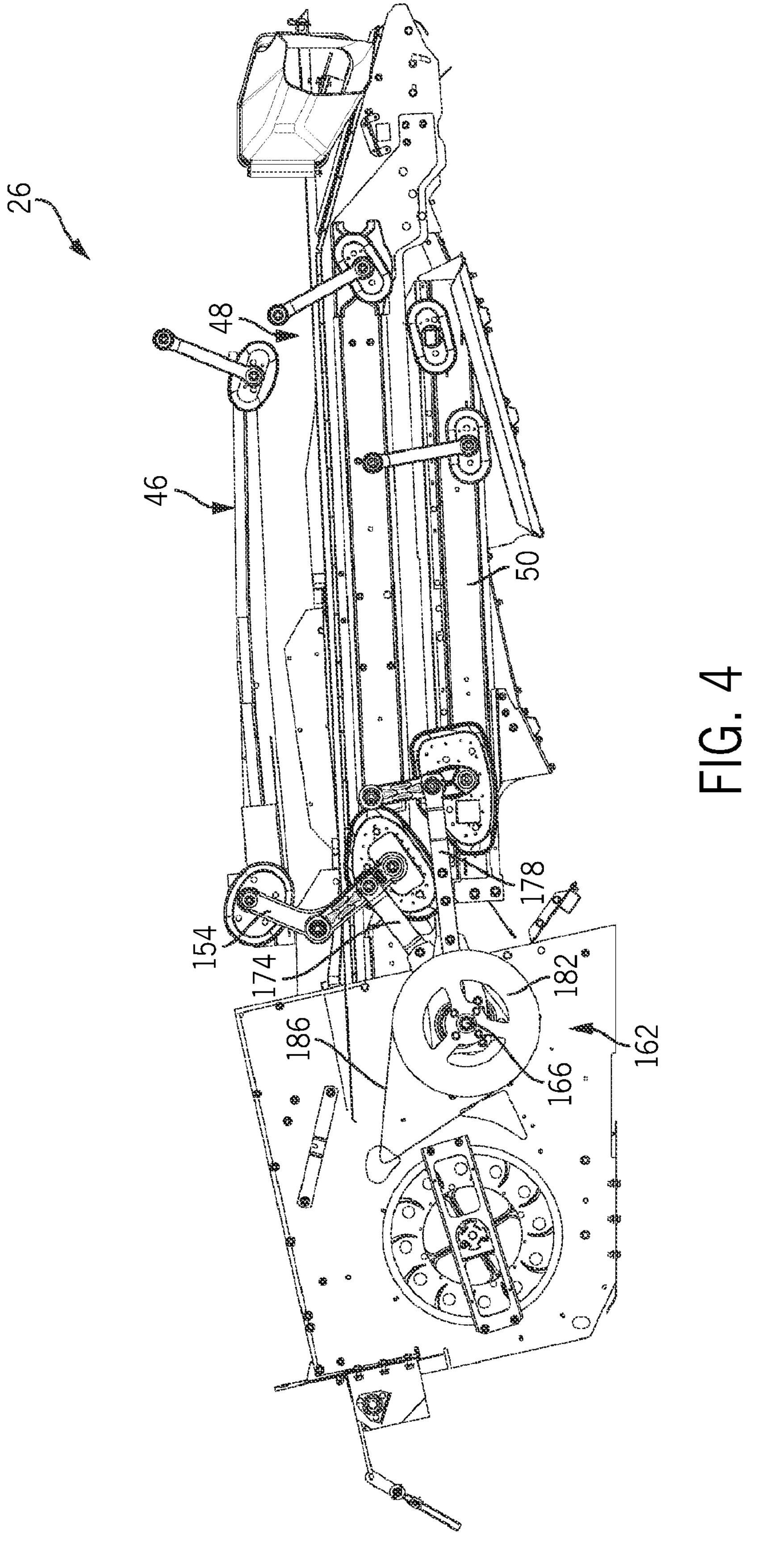
FIG. 4 is an elevation view of the grain cleaning system of FIG. 3.

Turning now to FIGS. 3 and 4, and is described in U.S. Pat. No. 9,844,186, which is incorporated by reference herein in its entirety, the chaffer 48 includes a first end 138 positioned proximate the fan 52 and a second end 142 positioned away from the fan 52. The chaffer 48 is positioned below a portion of the concave 42. In the illustrated embodiment, the harvester 10 also includes conveyor augers 146 positioned within grain pan 44. Grain that is separated by the forward portion of the concave 42 falls into troughs 150 of grain pan 44, where the augers 146 convey the grain to the first end 138 of the chaffer 48.

The (optional) pre-cleaning sieve 46 may be positioned above a portion of the chaffer 42 proximate the second end 142. The sieve 46 is linked to the chaffer 48 for reciprocating movement by a connecting arm 154. The sieve 46 collects grain from the concave 42 and deposits it onto the chaffer 48.

The shoe sieve 50 is positioned below the chaffer sieve 48. The sieve 50 reciprocates independently of the chaffer 48. The chaffer 48 and the sieve 50 each include louvers or slots (not shown) through which grain passes. The slots can be selectively opened and closed depending on the type and size of grain that is being harvested.

Figure 5:
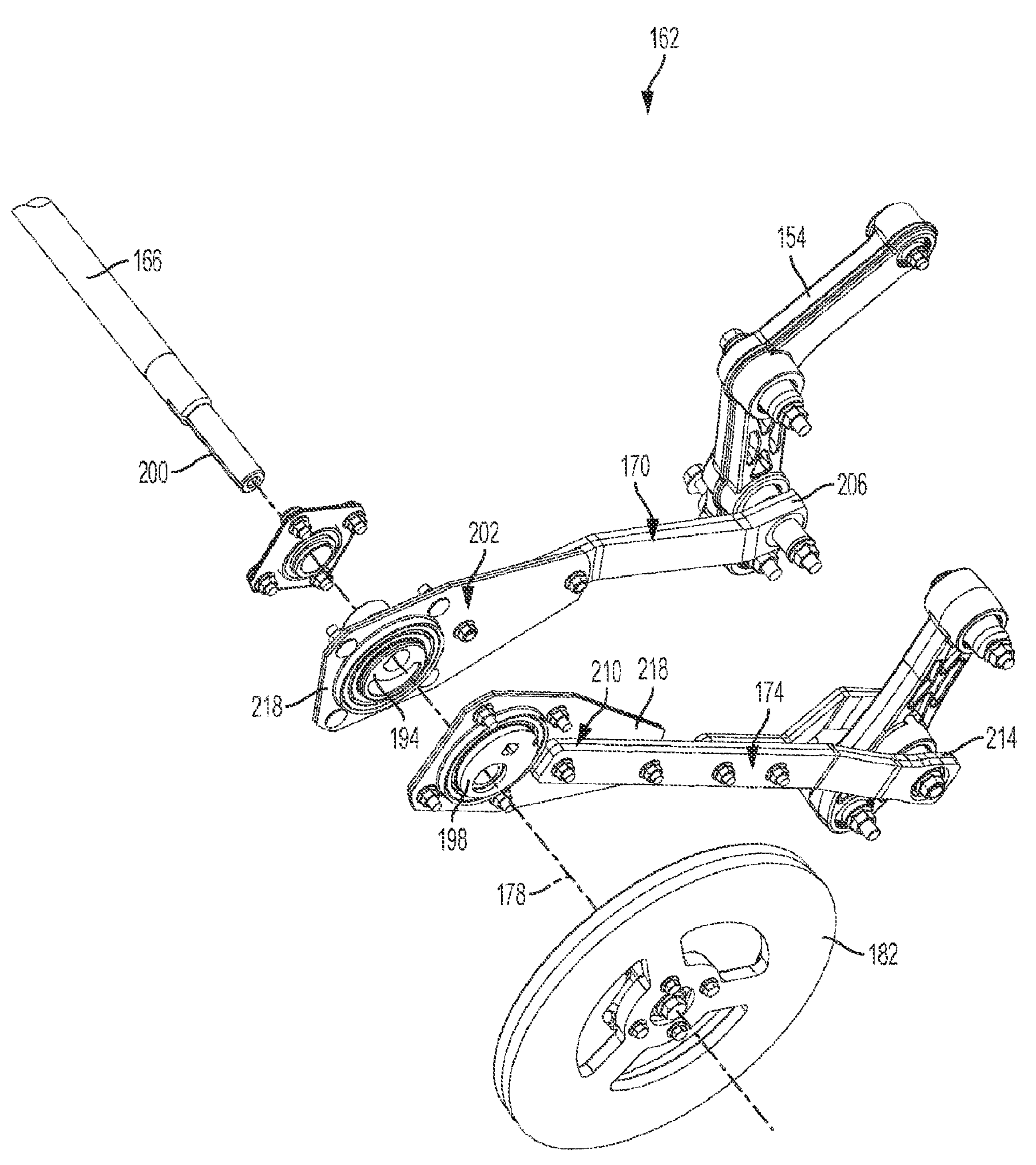
FIG. 5 is an isometric and exploded view of a drive mechanism for the cleaning system.
Figure 6:
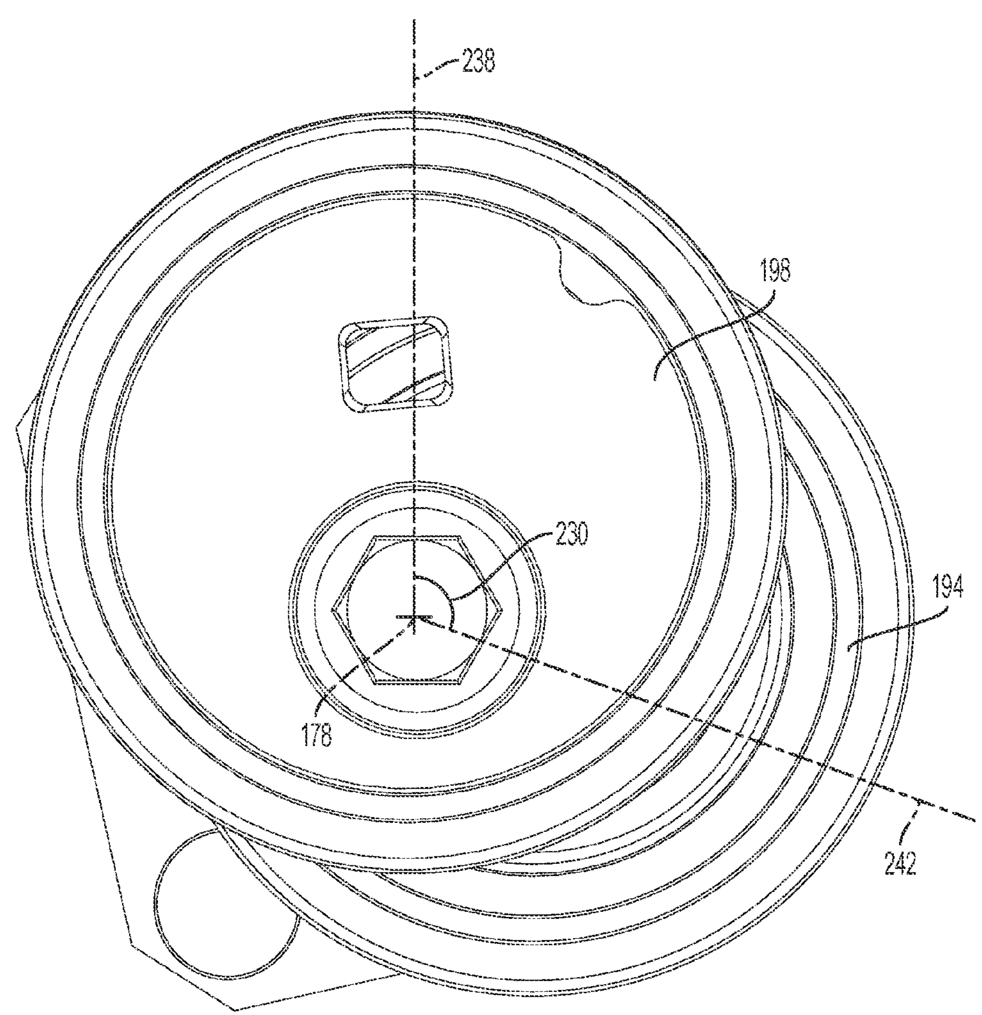
FIG. 6 is an end view of the drive shaft, the chaffer cam and the sieve cam.

Turning now to FIGS. 4 and 5, the cleaning system 26 further includes a drive system 162 for reciprocating the chaffer 48 and sieve 50. The drive system 162 includes a drive shaft 166, a first link or chaffer link 170, and a second link or sieve link 174. The drive shaft 166 rotates about a shaft axis 178 (FIG. 6). In the illustrated embodiment, the drive system 162 also includes a pulley or sheave 182 coupled to the drive shaft 166 and a belt 186 wrapped around a portion of the sheave 182. The belt 186 may be driven by a motor (not shown) to rotate the sheave 182 and the shaft 166. In other embodiments, another type of drive system may be used.

As shown in FIG. 5, the drive system 162 also includes a first cam or chaffer cam 194 eccentrically coupled to the shaft 166 and a second cam or sieve cam 198 eccentrically coupled to the shaft 166. In the illustrated embodiment, each cam 194, 198 is secured against rotation relative to the shaft 166 by a key 200 formed on the shaft 166. The chaffer link 170 includes a first end 202 coupled to the chaffer cam 194 and a second end 206 coupled to the connecting arm 154, which is in turn coupled to the sieve 46 as well as a center of gravity point of chaffer 48. The sieve link 174 includes a first end 210 coupled to the sieve cam 198 and a second end 214 coupled at or near a center of gravity point of the sieve 50. Connections to the respective center of gravity points are not necessarily shown in all of the figures.

In the illustrated embodiment, the chaffer link 170 and sieve link 174 are each formed as Pitman arms. The first ends 202, 210 each include flanges 218 that extend around the respective cams 194, 198. Although one side of the drive system 162 is shown in FIGS. 4 and 5, it is understood that another chaffer link 170, another sieve link 174, similar cams 194, 198, and/or an additional sheave/flywheel may be provided on the opposite end of the drive shaft 166. It should be understood that the details of the drive system 162 can vary greatly.

Turning now to FIG. 6, the chaffer cam 194 and the sieve cam 198 may be angularly offset from one another with respect to the shaft axis 178 by a phase angle 230. Stated another way, a first reference line 238 extends between the shaft axis 178 and a point on the chaffer cam 194 that is furthest from the shaft axis 178, and a second reference line 242 extends between the shaft axis 178 and a point on the sieve cam 198 that is furthest from the shaft axis 198. The phase angle 230 is defined as the angle between the first reference line 238 and the second reference line 242. The phase angle 230 provides a phase difference between the reciprocation of the chaffer link 170 and the reciprocation of the sieve link 174. The motions of the chaffer link 170 and the sieve link 174 are out of phase relative to each other, thereby causing the motions of the chaffer 48 and the sieve 50 to be out of phase relative to one another.

It should be understood that the design is not limited to any particular phase angle 230. The value of the phase angle 230 can vary depending upon the design of the cleaning system (e.g., component shapes, center of gravity, etc.). The phase angle may be selected to optimize a particular performance characteristic or support a limiting factor of the design, for example. The phase angle 230 may be 80 to 120 degrees, for example.

Figure 7:
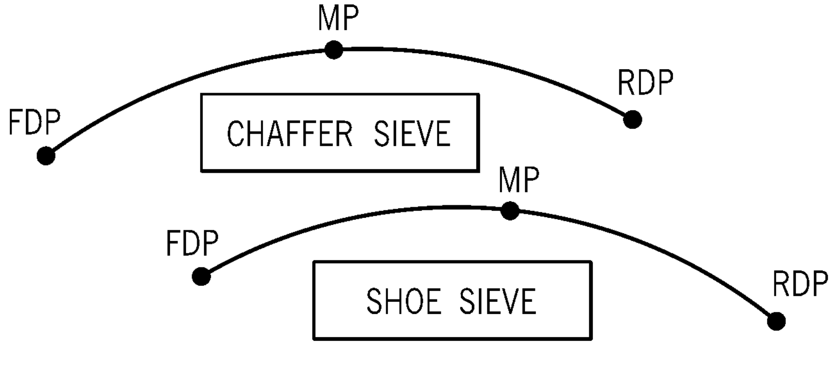
FIG. 7 depicts a schematic view of the chaffer and sieve paths.

Turning now to FIG. 7, both the chaffer 48 and sieve 50 reciprocate between a front dead point (FDP) and a rear dead point (RDP). In the FDP, the respective sieve cannot move further forward along its path, and, in the RDP, the respective sieve cannot move further rearward along its path. The path may be arcuate, curved, straight, ovular, eye-shaped, vertical, circular, and so forth. A midpoint (MP) is defined between the FDP and RDP. The drive system 162 is specially designed to control reciprocating motion of chaffer 48 and sieve 50 between the RDP and FDP with the goals of (i) minimizing vibrations of the cleaning system, (ii) minimizing destructive forces on the bearings (and other components) of cleaning system 26, and (iii) minimizing the power required to reciprocate the chaffer 48 and sieve 50 back and forth.

Specifically, to meet the aforementioned goals, the drive system 162 may be operated such that when the sieve 50 is in its RDP, the chaffer 48 is maintained at a location between its MP and FDP. Alternatively, to meet the aforementioned goals, the drive system 162 may be operated such that when the sieve 50 is in its FDP, the chaffer 48 is maintained at a location between its MP and RDP. Such operation is seen as a compromise or optimization (and referred to herein as an optimized arrangement) between a first arrangement in which the destructive forces are minimized and a second arrangement in which the power required to move the sieves is minimized. As background, in the first arrangement, when the sieve 50 is in its RDP, the chaffer 48 is in its FDP. And, in the second arrangement, when the sieve 50 is in its RDP or FDP, the chaffer is at its MP. It has been discovered that the optimized arrangement described above may be preferred because it results in (i) minimized vibrations of the cleaning system, (ii) minimized destructive forces on the bearings (and other components) of cleaning system 26, and (iii) minimized power required to reciprocate the chaffer 48 and sieve 50 back and forth. Alternatively, the above-described second arrangement, in which the power required to move the sieves is minimized, may be viewed as preferred. As another alternative, the above-described first arrangement may be viewed as preferred.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A grain cleaning system for a combine harvester, the combine harvester including a chassis and a header for harvesting agricultural material, said grain cleaning system comprising:

a chaffer sieve configured to be supported for movement relative to the chassis between a chaffer sieve front dead point (FDP) and a chaffer sieve rear dead point (RDP);

a shoe sieve positioned below at least a portion of the chaffer sieve, the shoe sieve configured to be supported for movement relative to the chassis between a shoe sieve FDP and a shoe sieve RDP;

a first link including a first end and a second end coupled to the chaffer sieve;

a second link including a first end and a second end coupled to the shoe sieve; and a drive shaft driven to rotate about a shaft axis, the rotation of the drive shaft driving the first link to reciprocate the chaffer sieve and driving the second link to reciprocate the shoe sieve, wherein either (i) when the shoe sieve is positioned at the shoe sieve FDP, the chaffer sieve is positioned at a location between the chaffer sieve RDP and a chaffer sieve midpoint (MP) position that is defined between the chaffer sieve RDP and chaffer sieve FDP, or (ii) when the shoe sieve is positioned at the shoe sieve RDP, the chaffer sieve is positioned at a location between the chaffer sieve FDP and the chaffer sieve MP, and wherein either (i) the second end of the first link is coupled to the chaffer sieve at a point on the chaffer sieve that constitutes a center of gravity of the chaffer sieve, or (ii) the second end of the second link is coupled to the shoe sieve at a point on the shoe sieve that constitutes a center of gravity of the shoe sieve.

2. The grain cleaning system of claim 1, wherein when the shoe sieve is positioned at the shoe sieve FDP, the chaffer sieve is positioned at a location between the chaffer sieve RDP and the chaffer sieve MP.

3. The grain cleaning system of claim 1, when the shoe sieve is positioned at the shoe sieve RDP, the chaffer sieve is positioned at a location between the chaffer sieve FDP and the chaffer sieve MP.

4. The grain cleaning system of claim 1, the drive shaft including a first cam and a second cam, the first cam coupled to the first end of the first link, the second cam coupled to the first end of the second link, wherein the second cam is angularly offset relative to the first cam by a phase angle.

5. The grain cleaning system of claim 4, wherein the phase angle is selected so as to minimize vibrations of the cleaning system.

6. The grain cleaning system of claim 4, wherein the phase angle is selected so as to minimize destructive forces on bearings and/or other components of the cleaning system.

7. The grain cleaning system of claim 4, wherein the phase angle is selected so as to minimize a power required to reciprocate the chaffer and shoe sieves back and forth.

8. The grain cleaning system of claim 1, wherein in the shoe sieve RDP and the chaffer sieve RDP, neither the shoe sieve nor the chaffer sieve can move further rearward along their respective paths, and, in the shoe sieve FDP and the chaffer sieve FDP, neither the shoe sieve nor the chaffer sieve can move further forward along their respective paths.

9. A combine harvester comprising the grain cleaning system of claim 1.

10. A grain cleaning system for a combine harvester, the combine harvester including a chassis and a header for harvesting agricultural material, said grain cleaning system comprising:

a chaffer sieve configured to be supported for movement relative to the chassis between a chaffer sieve front dead point (FDP) and a chaffer sieve rear dead point (RDP);

a shoe sieve positioned below at least a portion of the chaffer sieve, the shoe sieve configured to be supported for movement relative to the chassis between a shoe sieve FDP and a shoe sieve RDP;

a first link including a first end and a second end coupled to the chaffer sieve;

a second link including a first end and a second end coupled to the shoe sieve; and a drive shaft driven to rotate about a shaft axis, the rotation of the drive shaft driving the first link to reciprocate the chaffer sieve and driving the second link to reciprocate the shoe sieve, wherein when the shoe sieve is positioned in the shoe sieve RDP or the shoe sieve FDP, the chaffer sieve is positioned at a chaffer sieve midpoint (MP) that is defined between the chaffer sieve RDP and chaffer sieve FDP, and wherein either (i) the second end of the first link is coupled to the chaffer sieve at a point on the chaffer sieve that constitutes a center of gravity of the chaffer sieve, or (ii) the second end of the second link is coupled to the shoe sieve at a point on the shoe sieve that constitutes a center of gravity of the shoe sieve.

11. The grain cleaning system of claim 10, wherein in the shoe sieve RDP and the chaffer sieve RDP, neither the shoe sieve nor the chaffer sieve can move further rearward along their respective paths, and, in the shoe sieve FDP and the chaffer sieve FDP, neither the shoe sieve nor the chaffer sieve can move further forward along their respective paths.

12. The grain cleaning system of claim 10, the drive shaft including a first cam and a second cam, the first cam coupled to the first end of the first link, the second cam coupled to the first end of the second link, wherein the second cam is angularly offset relative to the first cam by a phase angle.

13. A combine harvester comprising the grain cleaning system of claim 10.

* * * * *